United States Patent [19]
Hara

[11] Patent Number: 5,966,497
[45] Date of Patent: Oct. 12, 1999

[54] MAGNETIC RECORDING AND REPRODUCING APPARATUS

[75] Inventor: Mitsuhiko Hara, Yokohama, Japan

[73] Assignee: Victor Company of Japan, Ltd., Yokohama, Japan

[21] Appl. No.: 08/906,934

[22] Filed: Aug. 6, 1997

[30] Foreign Application Priority Data

Feb. 28, 1997 [JP] Japan .................................... 9-062532

[51] Int. Cl.⁶ .................................................... G11B 21/04
[52] U.S. Cl. ........................ 386/103; 360/73.13; 360/70; 386/104
[58] Field of Search ................................. 386/21, 23, 39, 386/88, 96, 103–104, 113, 123, 124; 360/70, 73.13, 75, 77.13

[56] References Cited

U.S. PATENT DOCUMENTS 5,499,145  3/1996  Azuma et al. ........................ 386/123
5,548,410  8/1996  Kim et al. ............................ 386/104

Primary Examiner—Aristotelis M. Psitos
Assistant Examiner—Dan Israel Davidson
Attorney, Agent, or Firm—Jacobson, Price, Holman & Stern, PLLC

[57] ABSTRACT

When video signals, audio signals, computer data, etc. are recorded in digital fashion on a magnetic tape, the timing at which the control pulse is recorded is set appropriately. The control pulse forming circuit (31) sets a travel distance of the magnetic tape (4) from a position midway of the digital signal pattern ($D_2$) now being recorded by the 2ch second magnetic head (8b) to the outlet position of the digital signal pattern ($D_2$) to a $\Delta X$ value, when the 2ch first magnetic head (7b) reaches the outlet position of a virtual video signal pattern ($V_2$), without recording with advance of magnetic tape travel; and further records the control pulse C by shifting the recording timing of the control pulse C by a value corresponding to the $\Delta X$ value relative to a prescribed distance X value on the magnetic tape (4).

3 Claims, 8 Drawing Sheets

MAGNETIC RECORDING AND REPRODUCING APPARATUS

BACKGROUND OF THE INVENTION

1. Field of the Invention

The present invention relates to a magnetic recording and reproducing apparatus, and more specifically to an apparatus for recording and reproducing video signals, audio signals, computer data, etc. on and from a magnetic tape digitally, while keeping an upper compatibility with another magnetic recording and reproducing apparatus of helical scanning type designed in conformity with the well-known VHS standard, S-VHS standard, etc.

2. Description of the Related Art

An example of related art magnetic recording and reproducing apparatus of helical scanning type will be explained hereinbelow with reference to FIG. 1 to FIG. 5. FIG. 1 is a plane view showing the same related art apparatus; FIG. 2(A) is a plane view showing a rotary drum of the related art same apparatus, on which first to third magnetic heads are mounted; FIG. 2(B) is a front view of the same rotary drum; FIG. 2(C) is a view showing the mounting heights of both the first and second magnetic heads; FIG. 3 is a view showing the status where a video signal pattern, a high fidelity audio (Hi-Fi FM audio) signal pattern, and a control pulse are recorded on a magnetic tape, by use of the related art magnetic recording and reproducing apparatus of helical scanning type; FIG. 4 is an enlarged plane view showing the vicinity of the rotary drum for assistance in explaining an X value shown in FIG. 3; and FIG. 5 is a structural view (block diagram) showing a related art control pulse recording section for recording the control pulse on the magnetic tape by use of the same related art magnetic recording apparatus of helical scanning type.

As shown in FIG. 1, in the related art magnetic recording and reproducing apparatus 1A of helical scanning type designed in conformity with the well-known VHS standard, S-VHS standard, etc., a magnetic tape 4 is pulled out of a tape cassette 3 mounted on a chassis base 2, and further wound helically around a fixed drum 5 fixedly mounted on a chassis base 2 and around a rotary drum 6 rotatably mounted coaxially with the fixed drum 5 over a predetermined angle, so that signals can be recorded and reproduced on and from the magnetic tape by use of first, second and third magnetic heads 7 to 9 mounted on the rotary drum 6 integral therewith. Further, the control pulse is recorded on a lower side edge portion of the magnetic tape 4 by use of a control head 10a of an AC (audio control) head 10 fixedly mounted on the downstream side of the rotary drum 6. Further, when the control pulse is reproduced, the travel of the magnetic tape 4 pinched between a capstan 11 and a pinch roller 12 can be controlled on the basis of the control pulse.

Here, the fixed drum 5 is formed with a lead (not shown) for guiding the lower side edge portion of the magnetic tape 4 helically at a predetermined lead angle. Further, a predetermined angle over which the magnetic tape 4 is wound around the rotary drum 6 is defined by a tape wound-up angle between an inlet position (i.e., reference angle 0°) at which the magnetic tape 4 begins to contact with the outer circumference surface 6a of the rotary drum 6) and an outlet position at which the magnetic tape 4 begins to be separated from the outer circumference surface 6a of the rotary drum 6. Further, in order to secure the compatibility with the other magnetic tapes 4 in accordance with the well-known VHS standard and S-VHS standard, in the case of a large diameter (about 62 mm) rotary drum 6, the tape wound-up angle is set to roughly 180°; on the other hand, in the case of a small diameter (about 41.3 mm) rotary drum 6, the tape wound-up angle is set to roughly 270°.

Here, when the drum diameter of the rotary drum 6 is large (e.g., about 62 mm), for instance as shown in FIG. 2(A), the first magnetic head 7 mounted on the rotary drum 6 integral therewith is composed of a pair of the first magnetic heads 7a and 7b having two different azimuth angles of ±6° in correspondence to 1ch and 2ch so as to record and reproduce video signals in standard time mode; the second magnetic head 8 mounted on the same rotary drum 6 is composed of a pair of the second magnetic heads 8a and 8b having two different azimuth angles of ±30° in correspondence to 1ch and 2ch so as to record and reproduce high fidelity audio (Hi-Fi FM audio) signals in standard play (ST) time and long play (LP) time modes; and the third magnetic head 9 mounted on the same rotary drum 6 is composed of a pair of the third magnetic heads 9a and 9b having two different azimuth angles of ±6° in correspondence to 1ch and 2ch so as to record and reproduce video signals in long time mode. These magnetic heads are all arranged along the outer circumferential surface 6a of the rotary drum 6 being separated from each other by a predetermined angle, respectively in such a way that each pair (7a and 7b), (8a and 8b) or (9a and 9b) of the first to third magnetic heads 7 to 9 is mounted in 180° symmetrical positional relationship with respect to each other with an axle 6b of the rotary drum 6 as its center.

Further, the 1ch second magnetic head 8a is mounted on the rearward side by 42° from the 1ch first magnetic head 7a; the 2ch second magnetic head 8b is mounted on the frontward side by 138° from the 1ch first magnetic head 7a; and the 1ch second magnetic head 8a is mounted on the frontward side by 138° from the 2ch first magnetic head 7b. Further, the 1ch third magnetic head 9a is mounted on the frontward side from the 1ch first magnetic head 7a; and the 2ch third magnetic head 9b is mounted on the frontward side from the 2ch first magnetic head 7b.

Further, as shown in FIG. 2(B), the first magnetic heads 7a and 7b and the third magnetic heads 9a and 9b are mounted on the bottom surface 6c of the rotary drum 6. On the other hand, the second magnetic heads 8a and 8b are mounted at a high position a distance d (e.g., about 63 $\mu$m) higher than the bottom surface 6c of the rotary drum 6.

Further, for convenience of explanation, the description is omitted herein of the VHS standard for recording and reproducing video signals by use of the first magnetic heads 7a and 7b or the third magnetic heads 9a and 9b and for recording and reproducing audio signals by use of an audio head 10b of the AC (audio control) head 10.

Further, the related art magnetic recording and reproducing apparatus 1A constructed as described above adopts such a deep layer recording method that high fidelity audio signals are recorded in a deep magnetic layer portion of the magnetic tape 4 by use of the second magnetic heads 8a and 8b and further, after the high fidelity audio signals have been recorded, video signals are recorded on a surface magnetic layer portion of the same magnetic tape 4 by use of the first magnetic heads 7a and 7b or the third magnetic heads 9a and 9b. This deep layer recording method is applied to the well-known VHS and S-VHS standards.

In the above-mentioned deep layer recording method, in general, the 1ch first magnetic head 7a and the 2ch second magnetic head 8b are used as one set, and the 2ch first magnetic head 7b and the 1ch second magnetic head 8a are used as the other set.

Therefore, when the 1ch first magnetic head 7a and the 2ch second magnetic head 8b (going ahead of the 1ch first magnetic head 7a) are paired, the positional relationship between both the magnetic heads 7a and 8b on the magnetic tape 4 can be shown as in FIG. 2(C).

In this case, as shown by FIGS. 2(B) and 2(C), although the 1ch and 2ch second magnetic heads 8a and 8b are mounted along the outer circumferential surface 6a of the rotary drum 6 at the above-mentioned predetermined mounting angles and the above-mentioned predetermined mounting height d, respectively, since the second magnetic heads 8a and 8b are only required to be arranged along video signal patterns $V_1$ and $V_2$ (described later with reference to FIG. 3) in accordance with VHS and S-VHS standards, each maker can freely decide the mounting angles and the mounting height of the second magnetic heads 8a and 8b on the rotary drum 6, from the design standpoint.

Therefore, as shown in FIG. 3, when video signals and high fidelity audio signals are recorded in analog fashion at a predetermined inclination angle with respect to the longitudinal direction of the magnetic tape 4 in conformity with the well-known S-VHS standard, after the analog high fidelity audio signal pattern $HA_2$ has been deep-recorded narrowly on the deep magnetic layer portion of the magnetic tape 4 by use of the 2ch second magnetic head 8b (going ahead of the 1ch first magnetic head 7a), the analog video signal pattern $V_1$ is superpose-recorded widely than the high fidelity audio signal pattern $HA_2$ on the surface magnetic layer portion of the magnetic tape 4 by use of the 1ch first magnetic head 7a. In the same way, after the high fidelity audio signal pattern $HA_1$ has been recorded by use of the 1ch second magnetic head 8a (going ahead of the 2ch first magnetic head 7b), the video signal pattern $V_2$ is recorded by use of the 2ch first magnetic head 7b, the above-mentioned sequence being repeated.

Further, on the lower side edge portion of the magnetic tape 4, the control pulse C is recorded by use of the control head 10a via control pulse recording means 20 (described later with reference to FIG. 5).

Here, under consideration of the compatibility with the magnetic recording and reproducing apparatus and the magnetic tape 4 designed in conformity with both the VHS standard and S-VHS standard (the same standard as with the case of the magnetic recording and reproducing apparatus 1A), as shown in FIGS. 3 and 4, a distance X [X value] is previously prescribed in accordance with the standards. Here, X value is a distance between an outlet position (the outlet position of the rotary drum 6) at which the 2ch first magnetic head 7b reaches the outlet position of the video signal pattern $V_2$ and the control head 10a on the magnetic tape 4. Further, when the 2ch first magnetic head 7b reaches the outlet position of the video signal pattern $V_2$ (the outlet position of the rotary drum 6), the control pulse C is recorded on the magnetic tape 4 by use of the control head 10a.

In more detail, as shown in FIG. 5, control pulse recording means 20 for recording the control pulse on the magnetic tape 4 by use of the control head 10a is composed of a control pulse forming circuit 21 for outputting the control pulse of 30 Hz as one-frame reference of the video signals, whenever the 2ch first magnetic head 7b reaches the outlet position of the video signal pattern $V_2$ (the outlet position of the rotary drum 6); a recording amplifier 22 for amplifying the control pulse formed by the control pulse forming circuit 21; and the control head 10a for recording the control pulse amplified by the recording amplifier 22 on the lower side edge portion of the magnetic tape 4 at a predetermined position on the magnetic tape 4, that is, a distance of the X value away from the position at which the 2ch first magnetic head 7b reaches the outlet position of the video signal pattern $V_2$ (the outlet position of the rotary drum 6).

Therefore, when the magnetic tape 4 is driven at a speed V (mm/sec), there exists a time difference X/V (sec) between the outlet position at which the 2ch first magnetic head 7b reaches the outlet position of the video signal pattern $V_2$ (the outlet position of the rotary drum 6) and the position at which the control pulse C is recorded (on the basis of conversion from distance to time).

Further, the above-mentioned X value can secure the compatibility between the apparatus 1A and the magnetic tapes 4, by deciding the timing at which the control pulse is recorded by use of the control head 10a, in relation to the video signal patterns $V_1$ and $V_2$ recorded on the magnetic tape 4 by the 1ch and 2ch first magnetic heads 7a and 7b, respectively.

Further, in the above-mentioned magnetic recording and reproducing apparatus 1A, although the operation of reproducing the signals recorded on the magnetic tape is not described, it is obvious that the travel of the magnetic tape is controlled on the basis of the control pulse recorded as described above.

By the way, although the above-mentioned magnetic recording and reproducing apparatus 1A designed in conformity with the well-known S-VHS standard is widely used, in the case of the deep-layer recording method, the video signals are recorded on the surface magnetic layer portion of the magnetic tape 4 in analog fashion and further the high fidelity audio signals are recorded on the deep magnetic layer portion of the magnetic tape 4 also in analog fashion.

On the other hand, although many magnetic recording and reproducing apparatus for recording and reproducing video signals, audio signals, computer data, etc. on and from the magnetic tape in digital fashion have been developed, in the case of the digital magnetic recording and reproducing apparatus, since there exists no compatibility with the analog magnetic recording and reproducing apparatus, it is impossible to reproduce the signals recorded on the magnetic tape 4 in analog fashion.

To overcome this problem, the same Applicant has proposed a magnetic recording and reproducing apparatus designed in conformity with D-VHS standard, for recording and reproducing video signals, audio signals, computer data, etc. on and from a magnetic tape in digital fashion, while keeping an upper compatibility with another analog magnetic recording and reproducing apparatus of helical scanning type designed in conformity with the well-known VHS standard and S-VHS standard.

Here, in the proposed magnetic recording and reproducing apparatus, video signals, audio signals and computer data can be recorded and reproduced on and from the magnetic tape 4 in digital fashion, by use of only the above-mentioned 1ch and 2ch second magnetic heads 8a and 8b.

In this case, when the timing at which the control pulse is recorded by use of the control head 10a is set in relation to the signal pattern recorded by use of the 1ch and 2ch second magnetic heads 8a and 8b in digital fashion, if the X value prescribed in accordance with the VHS standard and the S-VHS standard is used as it is, the following problem arises:

In more detail, if the start position at which the control pulse is started to be recorded on the side edge portion of the magnetic tape 4 by use of the control head 10a is set to the X value in correspondence to the time point when the 2ch second magnetic head 8b reaches the outlet position of the rotary drum 6, since the mounting angles and the mounting height d of both the 1ch and 2ch second magnetic heads 8a and 8b are decided unconditionally, there exists a problem in that such condition that the mounting angles and the mounting height d of the 1ch and 2ch second magnetic heads 8a and 8b cannot be set freely according to each maker as already explained. As a result, there exists a need of solving the above-mentioned problem involved in the related art magnetic recording and reproducing apparatus.

In addition, when the apparatus size is required to be reduced, since there exists the case where the mounting position of the control head 10a cannot be decided at the above-mentioned X value position, the magnetic recording and reproducing apparatus which can satisfy the compatibility in this point of view is desired.

SUMMARY OF THE INVENTION

With these problems in mind, therefore, it is the object of the present invention to provide the magnetic recording and reproducing apparatus which can solve the above-mentioned problems.

To achieve the above-mentioned objects, the present invention provides a magnetic recording and reproducing apparatus having an upper compatibility with another magnetic recording and reproducing apparatus having: a first magnetic head having predetermined azimuth angles in correspondence to a first channel and a second channel, respectively; a second magnetic head having predetermined azimuth angles different from those of the first magnetic head in correspondence to the first channel and the second channel, respectively; a rotary drum rotated in a state where a magnetic tape is wound helically over a predetermined angle from an inlet position to an outlet position thereof; and a control head for recording a control pulse for each frame on a side edge portion of the magnetic tape; a high fidelity audio signal pattern being recorded in analog fashion by the second magnetic head on a deep magnetic layer portion of the magnetic tape; a video signal pattern being recorded in analog fashion by the first magnetic head on a surface magnetic layer portion formed on the deep magnetic layer portion of the same magnetic tape in superposed positional relationship with respect to the audio signal pattern; and a control pulse being recorded by the control head via a control pulse recording section, when the first magnetic head reaches an outlet position of the video signal pattern, at a position a previously prescribed distance X value away from the outlet position of the video signal pattern; and wherein a digital signal pattern is recorded in digital fashion by use of only the second magnetic head at a predetermined inclination angle with respect to a longitudinal direction of the magnetic tape; and the control pulse recording section sets a travel distance of the magnetic tape from a position midway of the digital signal pattern now being recorded by the second magnetic head to the outlet position of the digital signal pattern to a ΔX value, when the first magnetic head reaches the outlet position of a virtual video signal pattern, without recording with advance of magnetic tape travel; and further records the control pulse by shifting control pulse recording timing by a value corresponding to the ΔX value relative to a previously prescribed distance X value on the magnetic tape.

Further, it is preferable that when the control head is disposed being shifted away from the previously prescribed distance X value on the magnetic tape, the ΔX value includes a positional offset rate of the control head.

As described above, in the magnetic recording and reproducing apparatus according to the present invention, which can keep an upper compatibility with another magnetic recording and reproducing apparatus of helical scanning type designed in conformity with the well-known VHS standard and S-VHS standard, when video signals, audio signals, computer data, etc. are recorded in digital fashion on a magnetic tape, since the control pulse is recorded on the side edge portion of the magnetic tape by shifting the timing of a control pulse to a value corresponding to the ΔX value relative to the previously prescribed distance X value on the magnetic tape, even if the mounting angles and the mounting height of the 1ch and 2ch second magnetic heads are appropriately decided for each maker, it is possible to set the timing of recording the control pulse for each maker.

Further, even when the control head is disposed being shifted away from the previously prescribed distance X value on the magnetic tape, since the gist of the present invention can be applied, it is possible to reduce the size of the magnetic recording and reproducing apparatus.

DETAILED DESCRIPTION OF THE PREFERRED EMBODIMENTS

An embodiment of the magnetic recording and reproducing apparatus according to the present invention will be described hereinbelow with reference to the attached drawings.

Figure 6:
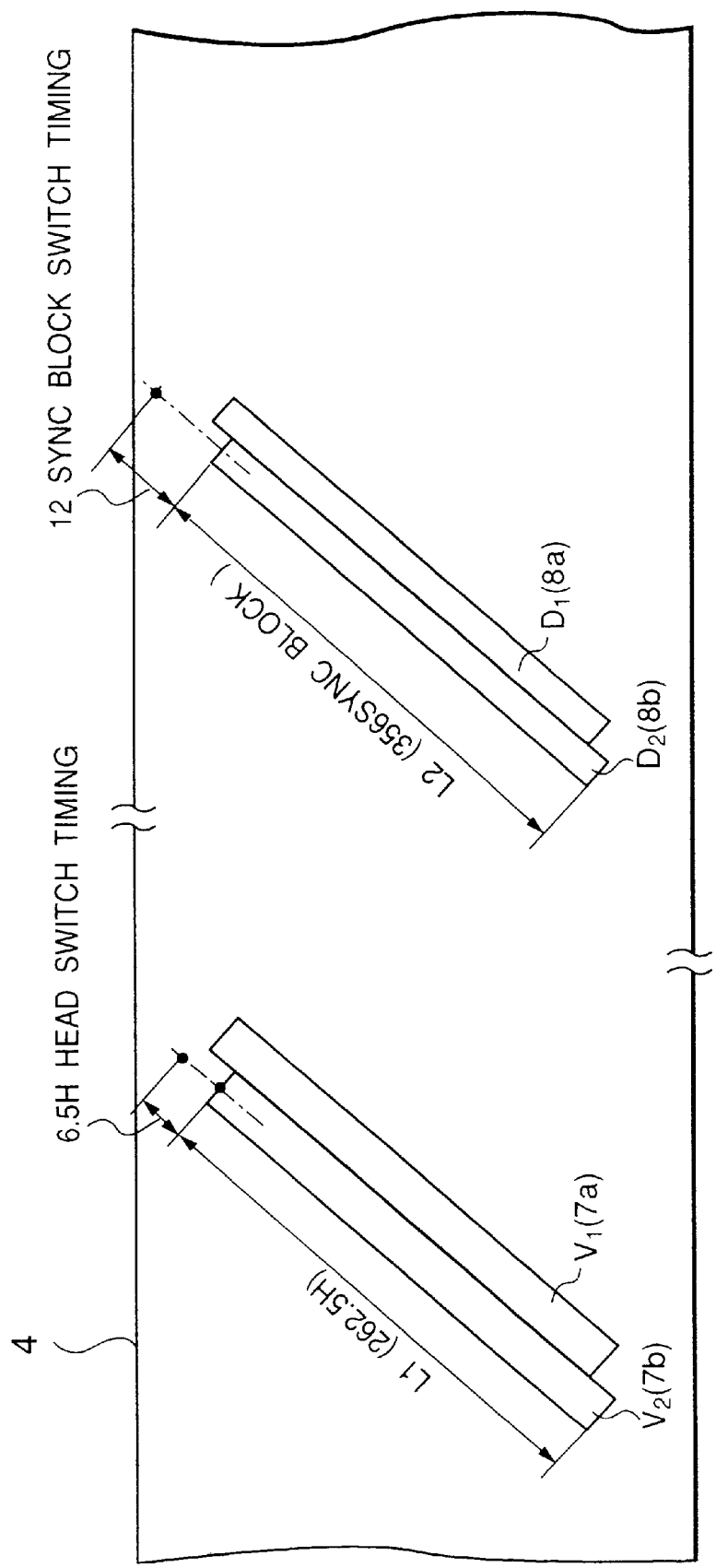
FIG. 6 is an illustration for assistance in explaining the status where analog video signal pattern is recorded on the magnetic tape by use of the first magnetic head and digital signal pattern is recorded on the magnetic tape by use of the second magnetic head, respectively, by use of a magnetic recording apparatus of helical scanning type according to the present invention.
Figure 7:
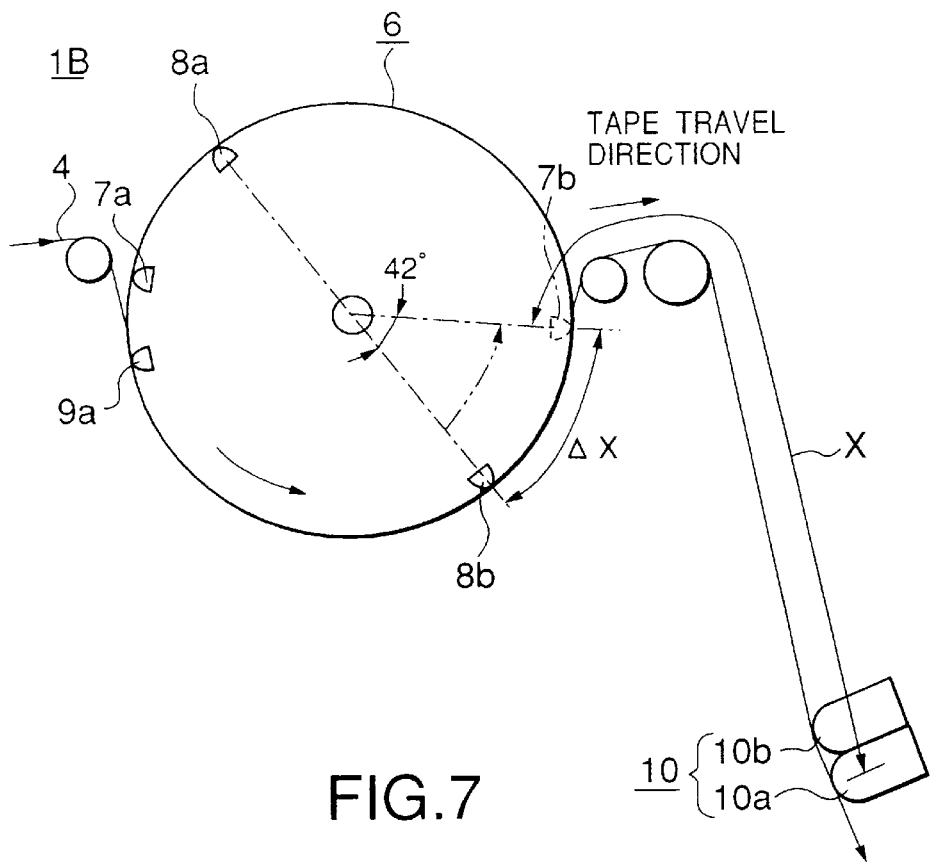
FIG. 7 is an enlarged plane view showing the vicinity of the rotary drum of the magnetic recording apparatus of helical scanning type according to the present invention, for assistance in explaining ΔX value and X value.
Figure 8:
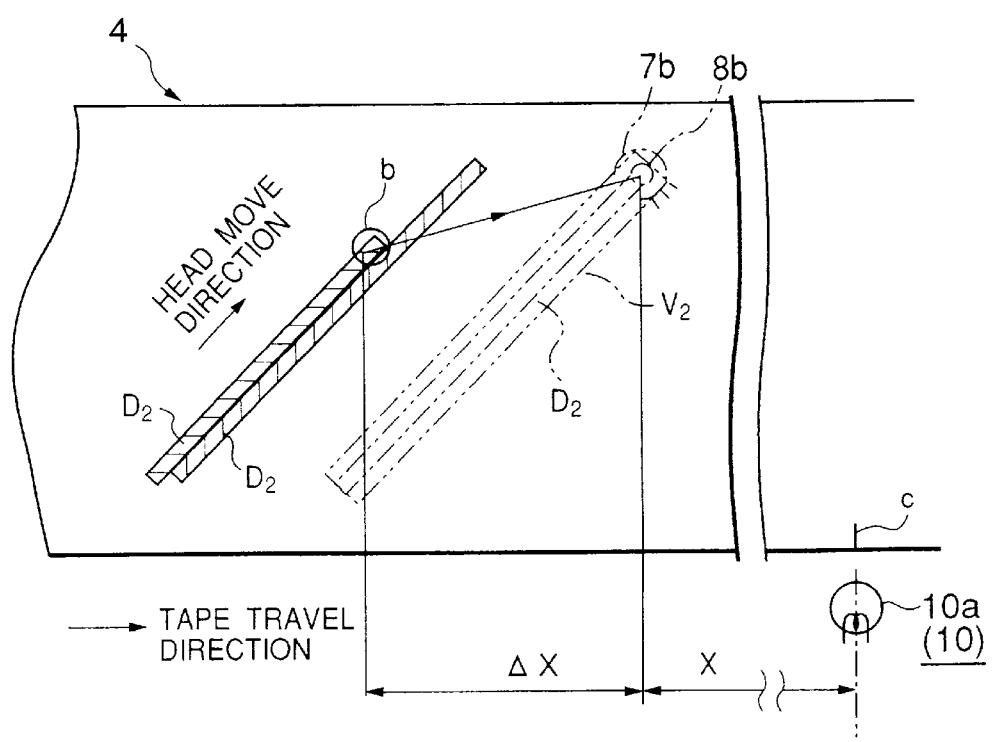
FIG. 8 is an illustration for assistance in explaining the status where the video signal pattern and the control pulse are recorded on the magnetic tape, by use of the magnetic recording and reproducing apparatus of helical scanning type according to the present invention.
Figure 9:
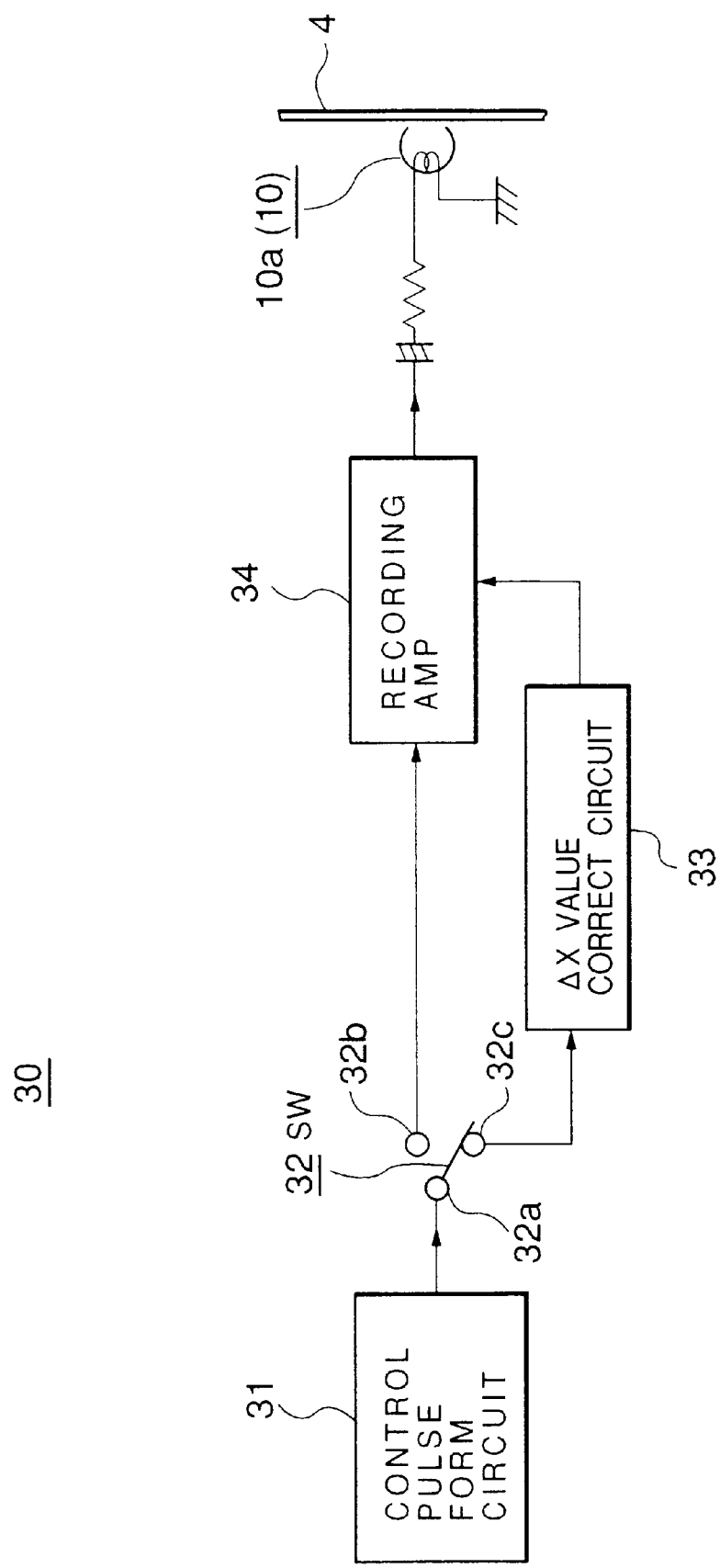
FIG. 9 is a block diagram showing control pulse recording means for recording the control pulse on the magnetic tape, by use of the magnetic recording and reproducing apparatus of helical scanning type according to the present invention.
Figure 10:
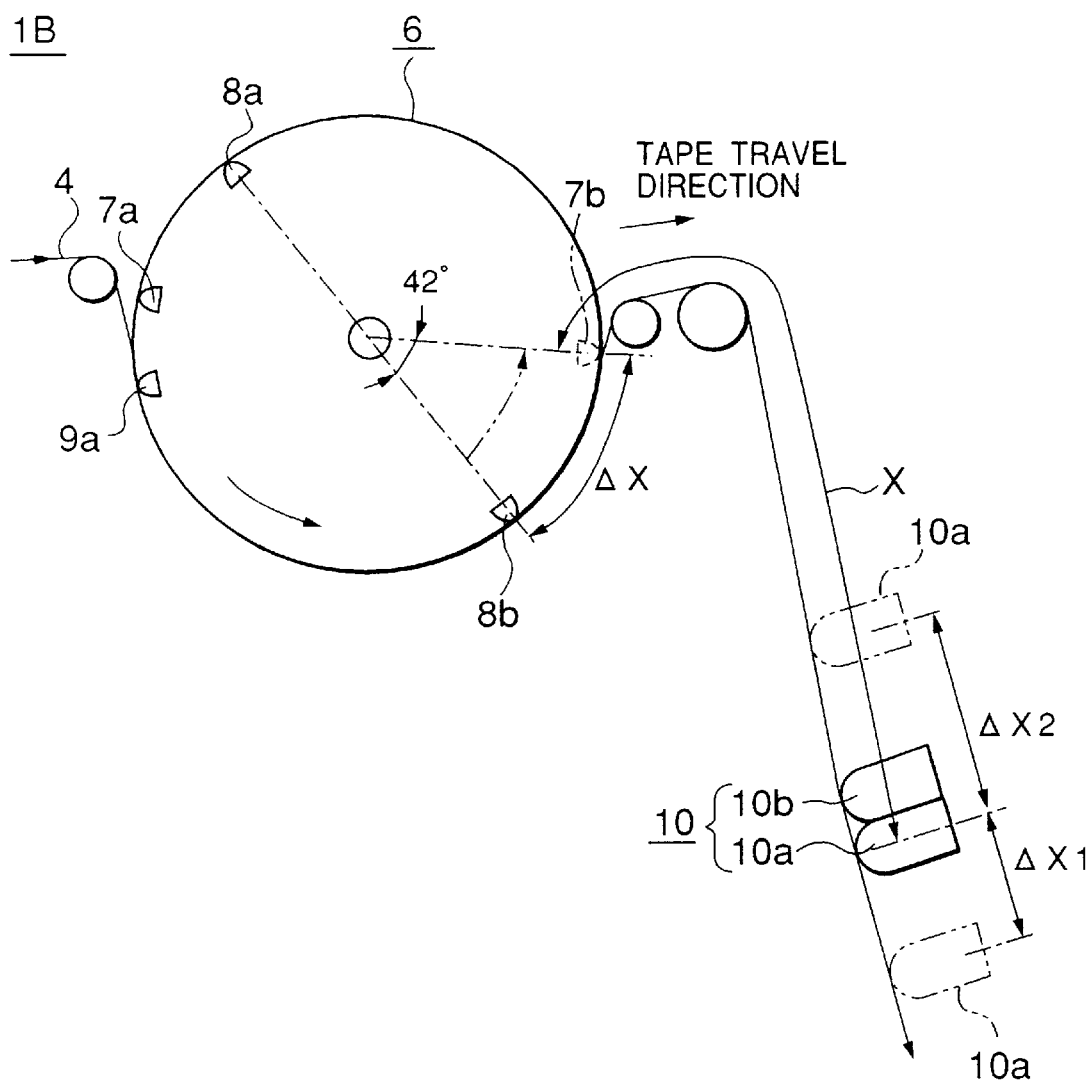
FIG. 10 is an illustration for assistance in explaining the status where the control head is disposed being offset away from the X value position for reasons of design, in the magnetic recording and reproducing apparatus of helical scanning type according to the present invention.

FIG. 6 shows the magnetic recording and reproducing apparatus of helical scanning type according to the present invention, by which the analog video signal patterns are recorded on the magnetic tape by use of the first magnetic head and the digital signal patterns are recorded on the magnetic tape by use of the second magnetic head, respectively. FIG. 7 shows the vicinity of the rotary drum of the magnetic recording apparatus of helical scanning type according to the present invention, for assistance in explaining a ΔX value and the X value. FIG. 8 shows the status where the video signal pattern and the control pulse are recorded on the magnetic tape, by use of the magnetic recording and reproducing apparatus of helical scanning type according to the present invention. FIG. 9 shows control pulse recording means for recording the control pulse on the magnetic tape, by use of the magnetic recording and reproducing apparatus of helical scanning type according to the present invention. FIG. 10 shows status where the control head is disposed being offset away from the X value position for reasons of design, in the magnetic recording and reproducing apparatus of helical scanning type according to the present invention.

Further, for the convenience of description, the same reference numerals have been retained for the similar parts or elements having the same functions as with the case of the related art magnetic recording and reproducing apparatus as already explained with reference to FIGS. 1 to 5. That is, only the points different from the related art magnetic recording and reproducing apparatus as already explained will be explained mainly in the following description of the embodiment.

Figure 1:
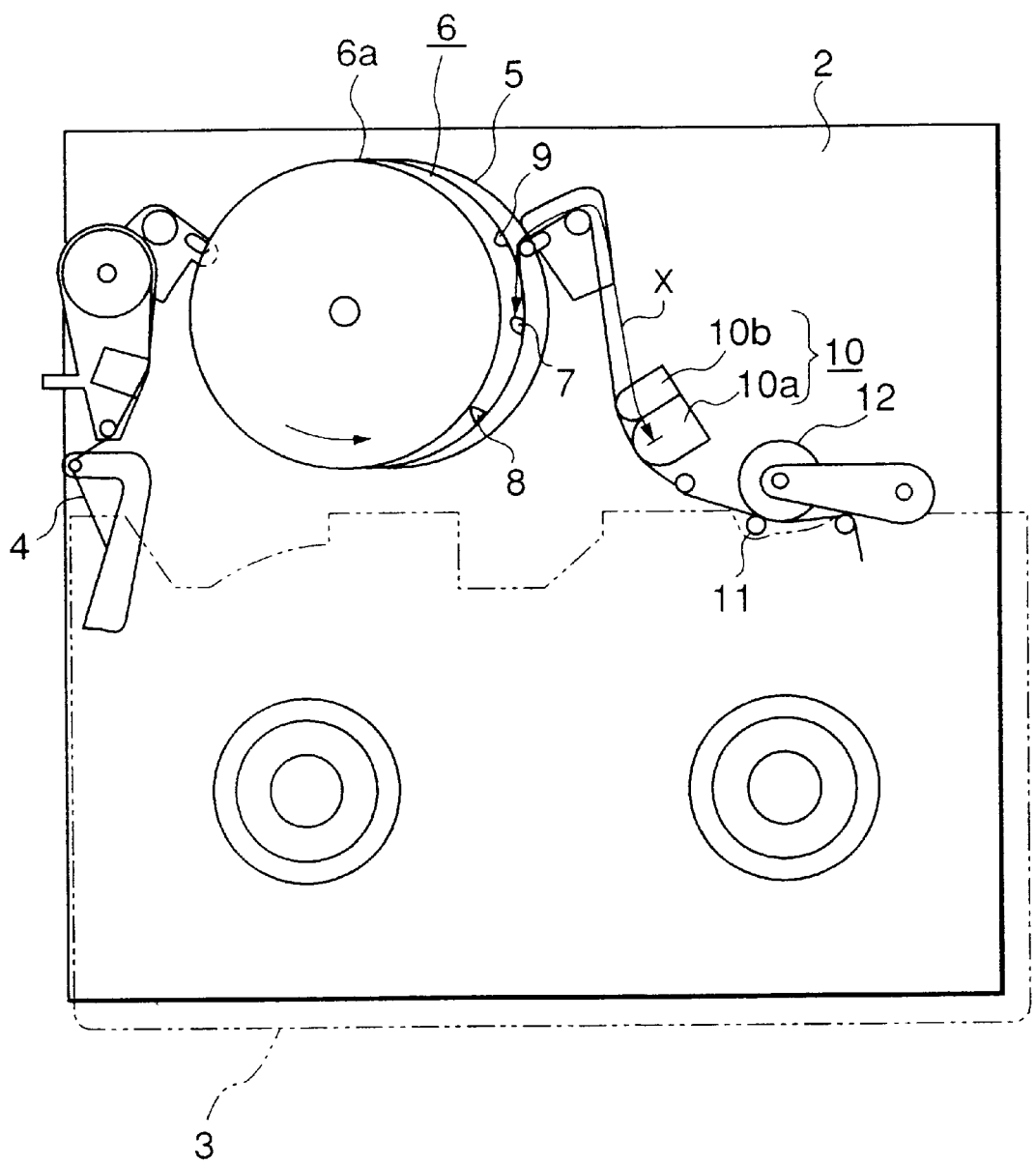
FIG. 1 is a plane view showing a related art magnetic recording and reproducing apparatus of helical scanning type.
Figure 2A:
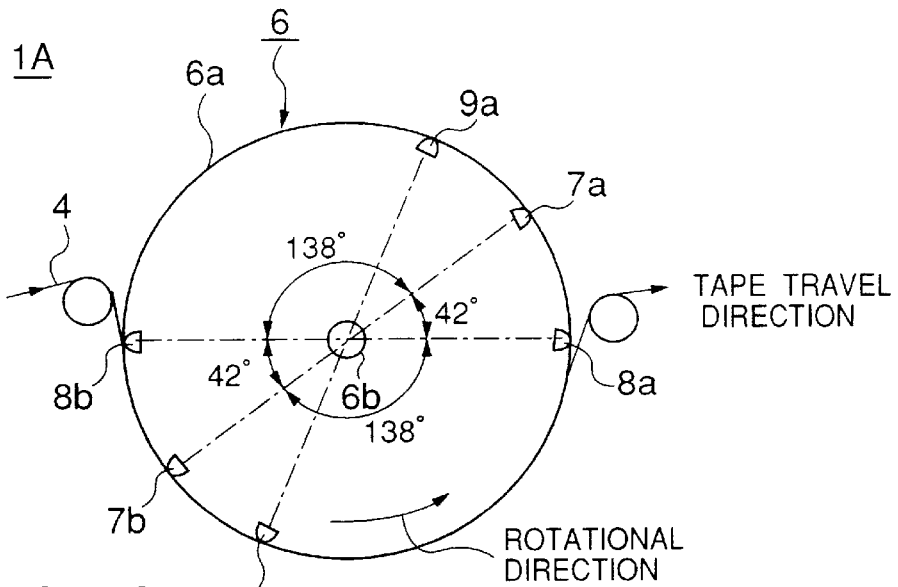
FIG. 2(A) is a plane view showing a rotary drum of the same related art apparatus shown in FIG. 1, on which first to third magnetic heads are mounted.
Figure 2B:
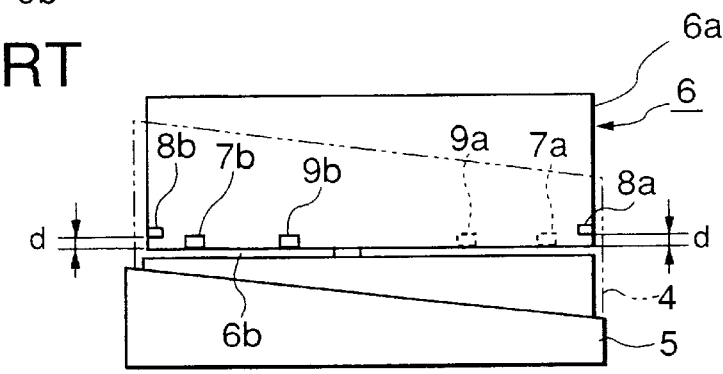
FIG. 2(B) is a front view showing the rotary drum of the same related art apparatus shown in FIG. 1, on which the first to third magnetic heads are mounted.
Figure 2C:
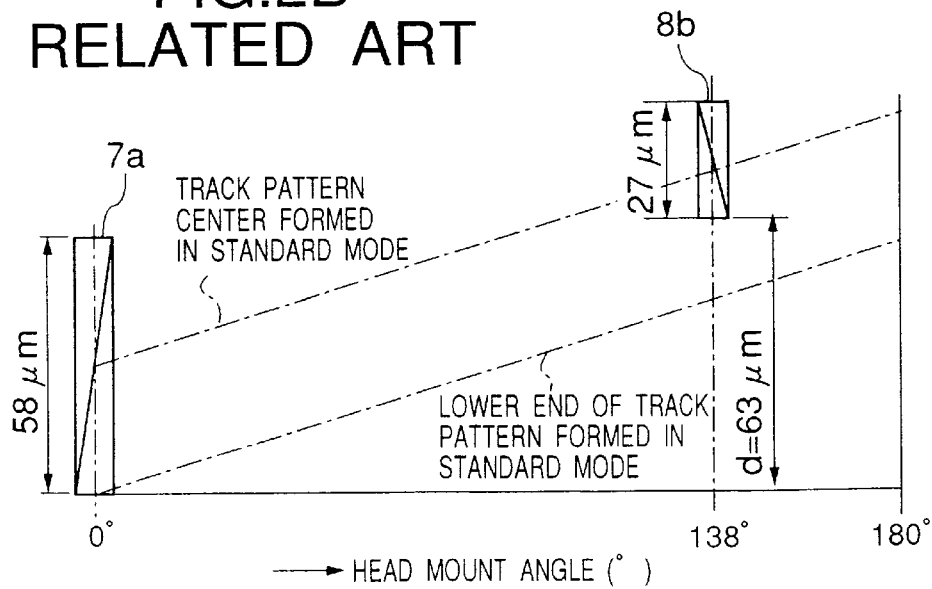
FIG. 2(C) is an illustration showing the rotary drum of the same related art apparatus shown in FIG. 1, on which the first and second magnetic heads are mounted.
Figure 3:
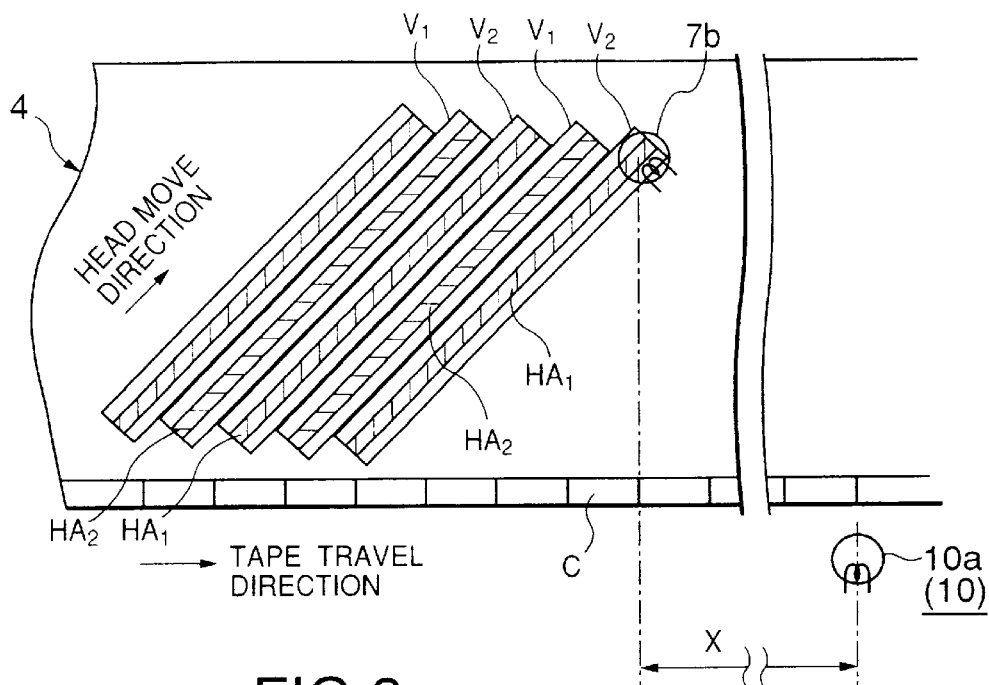
FIG. 3 is an illustration showing the status where a video signal pattern, a high fidelity audio signal pattern, and a control pulse are recorded on the magnetic tape, by use of the related art magnetic recording and reproducing apparatus of helical scanning type shown in FIG. 1.
Figure 4:
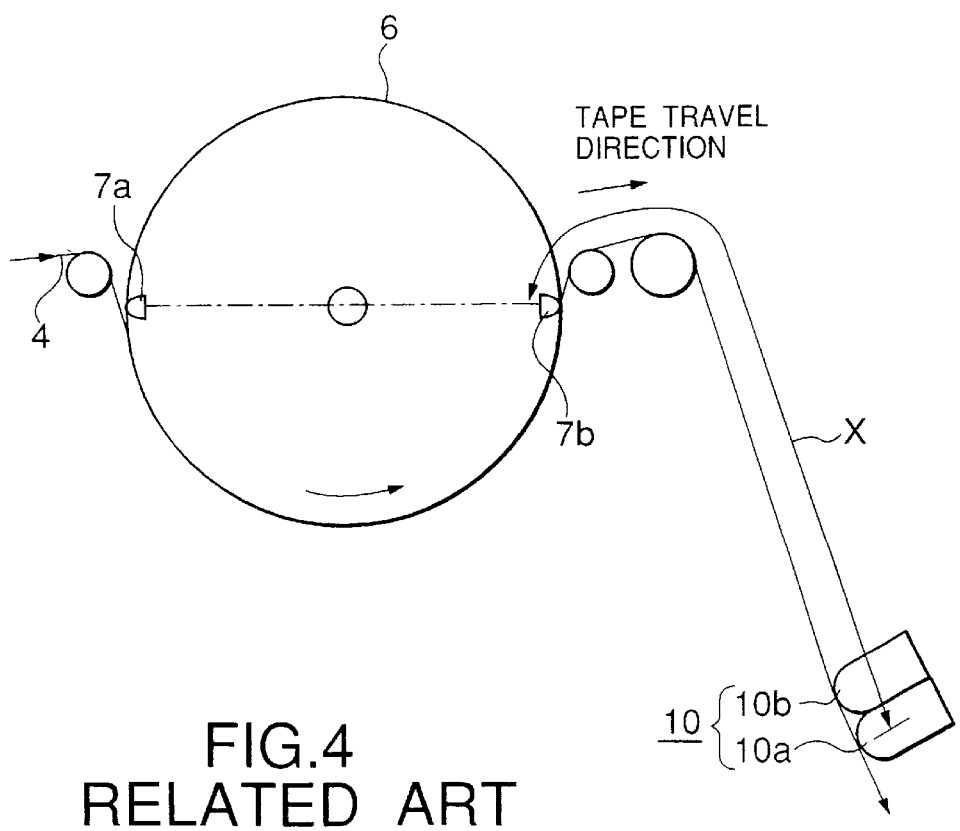
FIG. 4 is an enlarged plane view showing the vicinity of the rotary drum for assistance in explaining X value shown in FIG. 3.
Figure 5:
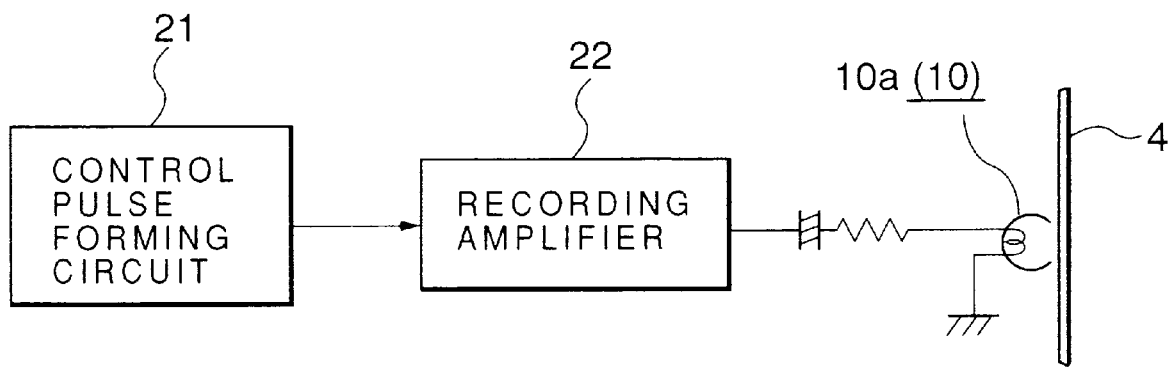
FIG. 5 is a block diagram showing control pulse recording means for recording a control pulse on the magnetic tape, by use of the same magnetic recording apparatus of helical scanning type shown in FIG. 1.

In the same way as with the related art magnetic recording and reproducing apparatus as shown in FIG. 1 and FIGS. 2(A), to 2(C), the magnetic recording and reproducing apparatus 1B according to the present invention shown in FIG. 7 is composed of the various tape traveling members, the first to third magnetic heads 7 to 9 mounted on the rotary drum 6 integrally therewith, the AC (audio control) head 10 fixedly disposed on the downstream side from the outlet side of the magnetic tape 4 wound helically around both the fixed drum 5 and the rotary drum 6, etc. Further, the magnetic recording and reproducing apparatus according to the present invention has an upper compatibility with the aforementioned analog magnetic recording and reproducing apparatus 1A designed in conformity with the VHS standard and the S-VHS standard. Further, in the D-VHS standard, video signals, audio signals, computer data, etc. can be recorded and reproduced on and from the surface magnetic layer portion of the magnetic tape 4 by use of the second magnetic head 8 in digital fashion.

Accordingly, in the apparatus according to the present invention, control pulse recording means 30 (as shown in FIG. 9) is partially improved. Here, the control pulse recording means 30 can set the timing at which the control pulse is recorded on the lower side edge portion of the magnetic tape 4 by use of the control head 10a in relation to the digital signal pattern recorded in the surface magnetic layer portion of the magnetic tape 4 by use of the second magnetic head 8.

Further, the construction as shown in FIGS. 2(A) to 2(C) will be explained hereinbelow by way of example, in which the drum diameter of the rotary drum 6 is relatively large (e.g., about 62 mm); the magnetic tape 4 is wound helically over about 180° angle extending from the inlet position to the outlet position of the rotary drum 6; and the first to third magnetic heads 7 to 9 are mounted in the mutual positional relationship as already explained. Here, of course, although the technical concept of the present invention can be applied to the case where the drum diameter of the rotary drum 6 is relatively small (e.g., about 41.3 mm); and the magnetic tape 4 is wound helically over about 270° angle extending from the inlet position to the outlet position of the rotary drum 6, the detailed description of this case is omitted herein.

As shown in FIG. 6, in the magnetic recording and reproducing apparatus 1B of the present invention, when video signals are recorded on the surface magnetic layer portion of the magnetic tape 4 widely as video signal patterns $V_1$ and $V_2$ by use of the 1ch and 2ch first magnetic heads 7a and 7b mounted on the rotary drum 6 in standard time mode in conformity with the VHS standard or the S-VHS standard, the track length $L_1$ of the video signal pattern $V_1$ or $V_2$ is a length corresponding to one field (262.5H) of the video signals (e.g., NTSC system), and in addition the magnetic head switching timing between 1ch and 2ch is set to a position further advanced by 6.5H from an end position of one field on the basis of the standard.

On the other hand, when video signals, audio signals, computer data, etc. are recorded on the surface magnetic layer portion of the magnetic tape 4 narrowly as digital signal patterns $D_1$ and $D_2$ by use of only the 1ch and 2ch second magnetic heads 8a and 8b mounted on the rotary drum 6 in conformity with the D-VHS standard, the track length $L_2$ of the digital signal pattern $D_1$ or $D_2$ is a length corresponding to the number of synch blocks divided into 356, and in addition the magnetic head switching timing between 1ch and 2ch is set to a position further advanced by 12 synch blocks from an end position of 356 synch blocks on the basis of the standard.

Accordingly, since the recording start and end positions of the digital signal patterns $D_1$ and $D_2$ are slightly offset from the recording start and end positions of the video signal patterns $V_1$ and $V_2$, the track length $L_2$ of the digital signal pattern $D_1$ or $D_2$ is slightly different from the track length $L_1$ of the video signal pattern $V_1$ or $V_2$.

Further, as shown in FIG. 8, the digital patterns $D_1$ and $D_2$ are recorded in digital fashion on the magnetic tape 4 at a predetermined inclination angle with respect to the longitudinal direction of the magnetic tape 4 by use of the 1ch and 2ch second magnetic heads 8a and 8b. Further, the control pulse C is recorded on the lower side edge portion of the magnetic tape 4 by use of the control head 10a via the control pulse recording means 30 (as shown in FIG. 9) described later.

Here, as shown in FIGS. 7 and 8, in the same way as with the case of the magnetic recording and reproducing apparatus 1B, the distance X on the magnetic tape 4 from the position at which the 2ch first magnetic head 7b reaches the outlet position of the video signal pattern $V_2$ to the control head 10a is previously prescribed as an [X] value on the basis of the standard as already explained. Therefore, when the 2ch first magnetic head 7b reaches the output position of the video signal pattern $V_2$ (the outlet position of the rotary drum 6), the control pulse C is recorded on the side edge portion of the magnetic tape 4 by use of the control head 10a at the position the distance X away from the outlet position of the video signal pattern $V_2$. As a result, the compatibility of the apparatus 1B and the magnetic tape 4 can be secured on the basis of the VHS standard and the S-VHS standard.

Here, in the case where video signals, audio signals, computer data, etc. are recorded on the magnetic tape 4 in digital fashion by use of the 1ch and 2ch second magnetic heads 8a and 8b on the basis of the D-VHS standard, when the 2ch first magnetic head 7b reaches the outlet position of the virtual video signal pattern $V_2$ (the outlet position of the rotary drum 6) without recording video signals, since the 2ch second magnetic head 8b for recording the digital signal pattern $D_2$ is mounted on the rearward side by 42° from the 2ch first magnetic head 7b as already explained, the 2ch second magnetic head 8b is positioned midway in the digital signal pattern $D_2$ as shown in FIG. 8. Further, with advance of the travel of the magnetic tape 4, the 2ch second magnetic head 8b reaches the outlet position of the digital signal pattern $D_2$ (the outlet position of the rotary drum 6), while recording the digital signal pattern $D_2$.

Therefore, when the 2ch first magnetic head 7b reaches the outlet position of the virtual video signal pattern $V_2$ (the outlet position of the rotary drum 6), without recording video signals, with advance of the travel of the magnetic tape 4, a travel distance of the magnetic tape 4 from a position midway of the digital signal pattern $D_2$ now being recorded by the 2ch second magnetic head 8b to the outlet position of the digital signal pattern $D_2$ (the outlet position of the rotary drum 6) is set to a ΔX value, which is referred to as [ΔX value], hereinafter. Here, this ΔX value is used to set the timing at which the control pulse is recorded relative to each of the digital signal patterns $D_1$ and $D_2$ recorded by the second magnetic head 8a and 8b, respectively, in cooperation with the X value, as describe later in further detail.

This ΔX value can be previously calculated on the basis of the conditions as (1) the mounting angles of the 2ch first magnetic head 7b and the 2ch second magnetic head 8b on the rotary drum 6, (2) the mounting height d of the 2ch second magnetic head 8b on the rotary drum 6, (3) the head switching timing (6.5H, 12 synch blocks) between the 2ch first and second magnetic heads 7b and 8b in the signal pattern, (4) the lead angle of the rotary drum, (5) the track inclination angle of the magnetic tape, etc. Further, this ΔX value is previously stored in a ΔX value correcting circuit 33 of the apparatus 1B as described later. Further, since the mounting angle and the mounting height d of the second magnetic heads 8a and 8b are determined appropriately according to each maker as already explained, the ΔX value is set appropriately according each maker on the basis of the above-mentioned calculation conditions.

Here, the essential element of the present invention, that is, the control pulse recording means 30 will be described hereinbelow with reference to FIG. 9, which is used to record the video signals, audio signals, computer data, etc. on the magnetic tape 4 in digital fashion by use of the 1ch and 2ch second magnetic heads 8a and 8b.

In FIG. 9, the control pulse recording means 30 is so constructed as to select one of the VHS standard, the S-VHS standard, and the D-VHS standard.

In more detail, the control pulse recording means 30 for recording the control pulse on the magnetic tape 4 by use of the control head 10a comprises a control pulse forming circuit 31, a selection switch 32, a ΔX value correcting circuit 33, and the control head 10a.

The control pulse forming circuit 31 outputs a control pulse of 30 Hz as one-frame reference of video signals, whenever the 2ch first magnetic head 7b reaches the outlet position of the video signal pattern $V_2$ (the outlet position of the rotary drum 6).

The selection switch 32 receives the control pulse formed by the control pulse forming circuit 31 through an input terminal 32a, and switches the received control pulse selectively from an output terminal 32b for the VHS and S-VHS standards to an output terminal 32c for the D-VHS standard or vice versa.

The ΔX value correcting circuit 33 outputs the control pulse formed by the control pulse forming circuit 31, by shifting the control pulse by a value corresponding to the travel distance ΔX value of the magnetic tape 4 from a position midway of the digital signal pattern $D_2$ now being recorded by the 2ch second magnetic head 8b to the outlet position of the digital signal pattern $D_2$ (the outlet position of the rotary drum 6), when the 2ch first magnetic head 7b reaches the outlet position of the virtual video signal pattern $V_2$ (the outlet position of the rotary drum 6) without recording with the advance to the travel of the magnetic tape 4.

The recording amplifier 34 amplifies the shifted control pulse. The control head 10a records the control pulse outputted by the recording amplifier 34 on the lower side edge portion of the magnetic tape 4.

Accordingly, when the digital signal pattern $D_2$ is recorded by use of the second magnetic heads 8a and 8b on the basis of the D-VHS standard, the timing at which the control pulse is recorded is shifted by a value corresponding to the ΔX value from the timing on the basis of the VHS standard and the S-VHS standard. In other words, when the magnetic tape 4 is moved at a speed V (mm/sec), the timing of recording the control pulse is shifted by ΔX/V (sec), in comparison with that determined in the VHS standard and the S-VHS standard.

In this case, when the 2ch first magnetic head 7b reaches the outlet position of the virtual video signal pattern $V_2$ (the outlet position of the rotary drum 6) without recording and further when the distance between the position of the 2ch second magnetic head 8b existing midway of the digital signal pattern and the position of the recorded control pulse C is converted into a tape travel time, there exists a time difference (X value±ΔX value)/V (sec), which corresponds to the distance (X value±ΔX value) on the magnetic tape 4. Here, the symbol ± implies an addition or a subtraction according to the mounting positions of both the second magnetic heads 8a and 8b. Further, the timing of the control signal C to be recorded is delayed or advanced by ΔX/V (sec) relative to X/V (sec).

As a result, even if the mounting angles and the mounting height of the 1ch and 2ch second magnetic heads 8a and 8b are determined appropriately according to each maker, it is possible to set the control pulse recording timing for each maker.

Further, there exists the case where the mounting position of the control head 10a is disposed being shifted from the position corresponding to the X value due to the design reasons (e.g., to reduce the size of the apparatus 1B), for instance in such a way that the mounting position of the control head 10 is shifted away by $\Delta X_1$ from the rotary drum 6 or when the mounting position of the control head 10 is shifted close by $\Delta X_2$ to the rotary drum 6. In this case, the shift rate ($\Delta X_1$ or $\Delta X_2$) of the position of the control head 10a is added to or subtracted from the $\Delta X$ value, in such a way that the control pulse can be shifted under consideration of the shift rate of the control head (10a) position. Further, in this case, the shift rate ($\Delta X_1$ or $\Delta X_2$) of the position of the control head 10a is previously stored in the $\Delta X$ value correcting circuit 33 together with $\Delta X$ value.

Further, in the above-mentioned description of the magnetic recording and reproducing apparatus 1B according to the present invention, although the case where the $\Delta X$ value and the X value are applied to the 2ch first and second magnetic heads 7b and 8b, respectively, without being limited only thereto, it is possible to apply the $\Delta X$ value and the X value to the 1ch first and second magnetic heads 7a and 8a, respectively.

Further, in the above-mentioned description of the magnetic recording and reproducing apparatus 1B according to the present invention, although the operation of reproducing signals recorded on the magnetic tape is not described, it may be apparent that the travel speed of the magnetic tape is controlled on the basis of the control pulse recorded as described above.

As described above, in the magnetic recording and reproducing apparatus according to the present invention which can keep an upper compatibility with the another magnetic recording and reproducing apparatus of helical scanning type designed in conformity with the well-known VHS standard and S-VHS standard, when video signals, audio signals, computer data, etc. are recorded in digital fashion on a magnetic tape, since the control pulse is recorded on the side edge portion of the magnetic tape by shifting the timing of a control pulse to a value corresponding to the $\Delta X$ value relative to the previously prescribed distance X value on the magnetic tape, even if the mounting angles and the mounting height of the 1ch and 2ch second magnetic heads are appropriately decided for each maker, it is possible to set the timing of recording the control pulse for each maker.

Further, even when the control head is disposed being shifted away from the previously prescribed distance X value on the magnetic tape, since the gist of the present invention can be applied, it is possible to reduce the size of the magnetic recording and reproducing apparatus.

What is claimed is:

1. A magnetic recording and reproducing apparatus having an upper compatibility with another magnetic recording and reproducing apparatus comprising:

a first magnetic head pair having predetermined azimuth angles in correspondence to a first channel and a second channel, respectively;

a second magnetic head pair having predetermined azimuth angles different from those of the first magnetic head pair in correspondence to the first channel and the second channel, respectively;

a rotary drum rotated in a state where a magnetic tape is wound helically over a predetermined angle from an inlet position to an outlet position thereof;

a control head for recording a control pulse for each frame on a side edge portion of the magnetic tape; and, a control pulse recording section for controlling the control head for recording the control pulse;

a high fidelity audio signal pattern being recorded in analog fashion by the second magnetic head pair on a deep magnetic layer portion of the magnetic tape;

a digital signal pattern being recorded digitally by the second magnetic head pair on a surface magnetic layer portion of the magnetic tape;

a video signal pattern being recorded in analog fashion by the first magnetic head pair on the surface magnetic layer portion formed on the deep magnetic layer portion of the same magnetic tape in superposed positional relationship with respect to the audio signal pattern;

a control pulse being recorded by the control head via the control pulse recording section, when a magnetic head of the first magnetic head pair reaches an outlet position of the video signal pattern, at a position a predetermined distance X value away from the outlet position of the video signal pattern; and wherein the digital signal pattern is recorded in digital fashion by use of only the second magnetic head pair at a predetermined inclination angle with respect to a longitudinal direction of the magnetic tape; and the control pulse recording section sets a travel distance of the magnetic tape from a position midway of the digital signal pattern now being recorded by a magnetic head of the second magnetic head pair to the outlet position of the digital signal pattern to a $\Delta X$ value, when a magnetic head of the first magnetic head pair reaches the outlet position of a virtual video signal pattern without recording with advance of magnetic tape travel; and further records the control pulse by shifting control pulse recording timing by a value corresponding to the $\Delta X$ value relative to a predetermined distance X value on the magnetic tape.

2. The magnetic recording apparatus of claim 1, wherein when the control head is shifted away from the predetermined distance X value on the magnetic tape, the $\Delta X$ value is a positional offset rate of the control head.

3. A magnetic recording and reproducing apparatus having an upper compatibility with another magnetic recording and reproducing apparatus comprising:

a first magnetic head pair having predetermined azimuth angles in correspondence to a first channel and a second channel, respectively;

a second magnetic head pair having predetermined azimuth angles different from those of the first magnetic head pair in correspondence to the first channel and the second channel, respectively;

a rotary drum rotated in a state where a magnetic tape is wound helically over a predetermined angle from an inlet position to an outlet position thereof;

a control head for recording a control pulse on a side edge portion of the magnetic tape;

a control pulse recording section for controlling the control head for recording the control pulse;

a digital video signal pattern being recorded in digital fashion by the second magnetic head pair;

an analog video signal pattern being recorded by the first magnetic head pair;

a control pulse for an analog video signal being recorded by the control head via the control pulse recording section, when a magnetic head of the first magnetic head pair reaches an outlet position of the analog video signal pattern, at a position a predetermined distance X value away from the outlet position of the analog video signal pattern; and, a control pulse for a digital video signal being recorded by the control head via the control pulse recording section, the control pulse recording section sets a travel distance of the magnetic tape from a position midway of the digital signal pattern now being recorded by a magnetic head of the second magnetic head pair to the outlet position of the digital signal pattern to a $\Delta X$ value; and further records the control pulse by shifting control pulse recording timing by a value corresponding to the $\Delta X$ value relative to a predetermined distance X value on the magnetic tape.

* * * * *